(12) United States Patent
Sitzmann et al.

(10) Patent No.: US 7,169,826 B2
(45) Date of Patent: Jan. 30, 2007

(54) OPTICAL FIBER COATINGS

(75) Inventors: Eugene V. Sitzmann, Newark, DE (US); Jean-Pierre Wolf, Maisprach (CH); David Bramer, Putnam Valley, NY (US); Greg Losapio, Mohegan Lake, NY (US)

(73) Assignee: Ciba Specialty Chemicals Corporation, Tarrytown, NY (US)

( * ) Notice: Subject to any disclaimer, the term of this patent is extended or adjusted under 35 U.S.C. 154(b) by 141 days.

(21) Appl. No.: 10/928,541

(22) Filed: Aug. 26, 2004

(65) Prior Publication Data

US 2005/0197417 A1    Sep. 8, 2005

Related U.S. Application Data

(60) Provisional application No. 60/498,848, filed on Aug. 29, 2003.

(51) Int. Cl.
*C08F 2/50*     (2006.01)
*C09D 11/00*    (2006.01)

(52) U.S. Cl. .......................... 522/18; 522/64; 522/96; 522/103

(58) Field of Classification Search .................. 522/18, 522/64
See application file for complete search history.

(56) References Cited

U.S. PATENT DOCUMENTS

| | | | | |
|---|---|---|---|---|
| 4,672,079 A * | 6/1987 | Li Bassi et al. | ............... | 522/35 |
| 5,942,290 A | 8/1999 | Leppard et al. | ............. | 427/510 |
| 6,020,528 A | 2/2000 | Leppard et al. | ............... | 568/15 |
| 6,084,911 A * | 7/2000 | Ishikawa | ................... | 375/240 |
| 6,103,453 A | 8/2000 | Prantl et al. | ............. | 430/281.1 |
| 6,136,880 A | 10/2000 | Snowwhite et al. | .......... | 522/64 |
| 6,251,963 B1 | 6/2001 | Köhler et al. | ................. | 522/64 |
| 6,284,813 B1 | 9/2001 | Leppard et al. | ................. | 522/8 |
| 6,361,925 B1 | 3/2002 | Leppard et al. | .......... | 430/281.1 |
| 6,376,571 B1 * | 4/2002 | Chawla et al. | ................. | 522/64 |
| 6,486,226 B2 * | 11/2002 | Al-Akhdar et al. | ........... | 522/18 |
| 6,486,228 B2 | 11/2002 | Köhler et al. | ................. | 522/64 |
| 6,584,263 B2 * | 6/2003 | Fewkes et al. | .............. | 385/128 |
| 6,869,981 B2 * | 3/2005 | Fewkes et al. | ................ | 522/33 |
| 7,109,250 B2 * | 9/2006 | Wolf et al. | ................... | 522/18 |
| 2003/0083395 A1 * | 5/2003 | Trentler et al. | ............... | 522/38 |

FOREIGN PATENT DOCUMENTS

| | | | |
|---|---|---|---|
| EP | 1 106 627 A1 * | 6/2001 | |
| WO | 02/081396 | 10/2002 | |
| WO | 03/046017 | 6/2003 | |

* cited by examiner

*Primary Examiner*—Susan Berman
(74) *Attorney, Agent, or Firm*—Tyler A. Stevenson

(57) ABSTRACT

Optical fiber coating compositions which comprise at least one ethylenically unsaturated polymerizable compound and a photoinitiator blend, wherein the blend comprises (a) bis(2,4,6-trimethylbenzoyl)phenylphosphine oxide and (b) 2,4,6,-trimethylbenzoylethoxyphenylphosphine oxide in an (a):(b) weight:weight ratio of between about 1:10 and about 1:8; or (c) bis(2,4,6-trimethylbenzoyl)phenylphosphine oxide, (d) 2,4,6,-trimethylbenzoylethoxyphenylphosphine oxide and (e) 2-hydroxy-2-methyl-1-phenyl-1-propanone in a (c):(d):(e) weight:weight:weight ratio between about 3:1:14 and about 4:1:16; or (f) bis(2,4,6-trimethylbenzoyl)phenylphosphine oxide and (g) 2-hydroxy-2-methyl-1-phenyl-1-propanone in a (f):(g) weight:weight ratio of between about 1:3 and about 1:5 exhibit fast photospeed, very low color and fast photobleaching. The photoinitiator blends have low volatility, high shelf life stability and high compatibility with resins and monomers. The photoinitiator blends are for example liquid and easy to use.

5 Claims, No Drawings

OPTICAL FIBER COATINGS

This application claims the benefit under 35 USC 119(e) of U.S. provisional application No. 60/498,848, filed Aug. 29, 2003.

The present invention is aimed at optical fiber coatings compositions which comprise particular blends of photoinitiators wherein at least one of the photoinitiators is of the bisacylphosphine oxide class.

Bisacylphosphine oxide photoinitiators are disclosed for example in U.S. Pat. Nos. 6,136,880, 6,103,453, 6,251,963, 6,486,228, 6,284,813, 6,361,925, 5,942,290, 6,020,528, and in WO02081396.

It has been found that certain photoinitiator (PI) blends are well suited for optical fiber coatings applications. In both primary and secondary optical fiber acrylate coatings the present PI blends provide for fast photospeed, very low color and fast photobleaching; the PI blends exhibit low volatility, high shelf life stability and high compatibility with resins and monomers. The PI blends are for example liquid and easy to use.

DETAILED DISCLOSURE

Disclosed is an optical fiber coating composition which comprises
at least one ethylenically unsaturated polymerizable compound and
a photoinitiator blend, wherein the blend comprises
(a) at least one bisacylphosphine oxide photoinitiator and
(b) at least one monoacylphosphine oxide photoinitiator wherein the (a):(b) weight:weight ratio is between about 1:32 and about 1:5.5 or
(c) at least one bisacylphosphine oxide photoinitiator and
(d) at least one monoacylphosphine oxide photoinitiator and
(e) at least one α-hydroxy ketone photoinitiator wherein the (c):(d):(e) weight:weight:weight ratio is between about 2:1:14 to about 5:2:17 or (f) at least one bisacylphosphine oxide photoinitiator and
(g) at least one α-hydroxy ketone photoinitiator wherein the (f):(g) weight:weight ratio is between about 1:3 to about 1:5.

The ratio of components (a):(b) by weight are for example between about 1:11 and about 1:7, for example the ratio is about 1:10, 1:9 or 1:8.

The ratio of components (c):(d):(e) by weight are for example between about 3:1:14 and about 4:1:16, for example about 3:1:15 or 3:1:16 of 4:1:15 or 4:1:16, for example about 3.5:1.0:15.5.

The ratio of components (f):(g) by weight are for example about 1:3, 1:4 or 1:5.

The PI blends are for example "neat", that is they contain no other components such as solvents or other diluents. The PI blends may contain further additives, such as antioxidants, flow aids, silane coupling agents, adhesion promoters, and the like.

However, according to this invention, the PI blends are normally neat. The neat PI blends are easy to handle liquids with low viscosity. That is, the Pi blends "consist essentially" or "consist" only of (a) and (b) or (c), (d) and (e) or (f) and (g).

The preparation of the PI blends is carried out for example by mixing, grinding, melting or dissolving the individual components, it being possible for liquid components to act as solvents for the combination partners.

The α-hydroxy ketone and monoacylphosphine oxide and bisacylphosphine oxide photoinitiators of this invention are known and are disclosed for example in U.S. Pat. Nos. 5,942,290, 5,534,559 and 6,020,528, the relevant disclosures of which are hereby incorporated by reference.

The bisacylphosphine oxide photoinitiators are of the formula

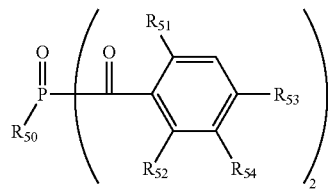

wherein
$R_{50}$ is $C_1$–$C_{12}$ alkyl, cyclohexyl or phenyl which is unsubstituted or is substituted by 1 to 4 $C_1$–$C_8$ alkyl or $C_1$–$C_8$ alkoxy,
$R_{51}$ and $R_{52}$ are each independently of the other $C_1$–$C_8$ alkyl or $C_1$–$C_8$ alkoxy or halogen,
$R_{53}$ is hydrogen or $C_1$–$C_8$ alkyl, and
$R_{54}$ is hydrogen or methyl.

For example, $R_{50}$ is $C_1$–$C_{12}$ alkyl, cyclohexyl or phenyl which is unsubstituted or is substituted by 1 to 4 $C_1$–$C_8$ alkyl or $C_1$–$C_8$ alkoxy,
$R_{51}$ and $R_{52}$ are each independently of the other $C_1$–$C_8$ alkyl, $C_1$–$C_8$ alkoxy or halogen,
$R_{53}$ is hydrogen or $C_1$–$C_8$ alkyl, and
$R_{54}$ is hydrogen or methyl.

For example, $R_{50}$ is $C_2$–$C_{10}$ alkyl, cyclohexyl or phenyl which is unsubstituted or is substituted by 1 to 4 $C_1$–$C_4$ alkyl or $C_1$–$C_6$ alkoxy.

For example, $R_{50}$ is $C_4$–$C_{12}$ alkyl, cyclohexyl or phenyl, $R_{51}$ and $R_{52}$ are each independently of the other $C_1$–$C_8$ alkyl or $C_1$–$C_8$ alkoxy and $R_{53}$ is hydrogen or C1–C8 alkyl.

For instance, $R_{51}$ and $R_{52}$ are methyl or methoxy and $R_{53}$ is hydrogen or methyl and $R_{50}$ is isobutyl, phenyl or isooctyl.

The monoacylphosphine oxide photoinitiators are of the formula

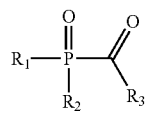

in which $R_1$ and $R_2$ independently of one another are $C_1$–$C_{12}$ alkyl, benzyl, phenyl which is unsubstituted or substituted from one to four times by halogen, $C_1$–$C_8$ alkyl and/or $C_1$–$C_8$ alkoxy, or are cyclohexyl or a group —$COR_3$, or
$R_1$ is —$OR_4$,
$R_3$ is phenyl which is unsubstituted or substituted from one to four times by $C_1$–$C_8$ alkyl, $C_1$–$C_8$ alkoxy, $C_1$–$C_8$ alkylthio and/or halogen, and
$R_4$ is $C_1$–$C_8$ alkyl, phenyl or benzyl.
For instance, $R_1$ is —$OR_4$.

For example, $R_2$ is phenyl which is unsubstituted or substituted from one to four times by halogen, $C_1$–$C_8$ alkyl and/or $C_1$–$C_8$ alkoxy.

For example, $R_3$ is phenyl which is unsubstituted or substituted from one to four times by $C_1$–$C_8$ alkyl.

For example, the bisacylphosphine oxide photoinitiators are bis(2,4,6-trimethylbenzoyl)phenylphosphine oxide or bis(2,4,6-trimethylbenzoyl)-(2,4-bis-pentyloxyphenyl)phosphine oxide; and the monoacyiphosphine oxide photo-initors are 2,4,6-trimethylbenzoylethoxyphenylphosphine oxide or 2,4,6-trimethylbenzoyldiphenylphosphine oxide.

The α-hydroxy ketone photoinitiators are of the formula

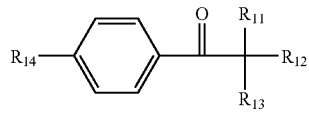

where $R_{11}$ and $R_{12}$ independently of one another are hydrogen, $C_1$–$C_6$ alkyl, phenyl, $C_1$–$C_6$ alkoxy, $OSiR_{16}(R_{17})_2$ or —O(CH$_2$CH$_2$O)$_q$—C$_1$–C$_6$ alkyl, or $R_{11}$ and $R_{12}$ together with the carbon atom to which they are attached, form a cyclohexyl ring, q is a number from 1 to 20, $R_{13}$ is OH, $C_1$–$C_{16}$ alkoxy or —O(CH$_2$CH$_2$O)$_q$—C$_1$–C$_6$ alkyl, $R_{14}$ is hydrogen, $C_1$–$C_{18}$ alkyl, $C_1$–$C_{18}$ alkoxy, —OCH$_2$CH$_2$—OR$_{15}$, a group CH$_2$=C(CH$_3$)—, CH$_2$=CH— or is

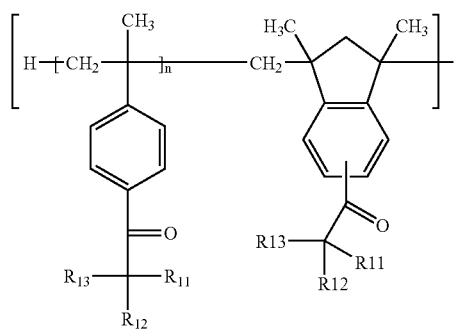

n is a number from 0 to 10, $R_{15}$ is hydrogen, —COCH=CH$_2$ or —COC(CH$_3$)=CH$_2$, and $R_{16}$ and $R_{17}$ independently of one another are $C_1$–$C_8$ alkyl or phenyl.

α-Hydroxy ketone photoinitiators that are of interest are those in which $R_{11}$, and $R_{12}$ independently of one another are hydrogen, $C_1$–$C_6$ alkyl or phenyl or $R_{11}$, and $R_{12}$, together with the carbon atom to which they are attached, form a cyclohexyl ring, $R_{13}$ is OH, and $R_{14}$ is hydrogen, $C_1$–$C_{12}$ alkyl, $C_1$–$C_{12}$ alkoxy, —OCH$_2$CH$_2$OR$_{15}$, —C(CH$_3$)=CH$_2$, —CH=CH$_2$ or is

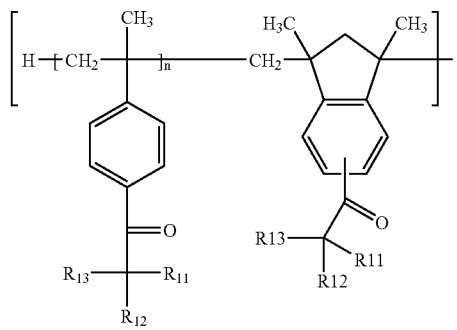

where n is a number from 0 to 10.

For example, suitable as the α-hydroxy ketone photoinitiators are those in which $R_{11}$ and $R_{12}$ independently of one another are methyl or ethyl or $R_{11}$ and $R_{12}$, together with the carbon atom to which they are attached, form a cyclohexyl ring, $R_{13}$ is hydrogen and $R_{14}$ is hydrogen, $C_1$–$C_4$ alkyl, $C_1$–$C_4$ alkoxy or —OCH$_2$CH$_2$OH.

For instance, suitable α-hydroxy ketone photoinitiators are

α-hydroxycyclohexyl phenyl ketone,
2-hydroxy-2-methyl-1-phenylpropanone,
2-hydroxy-2-methyl-1-(4-isopropylphenyl)propanone,
2-hydroxy-2-methyl-1-(4-dodecylphenyl)propanone and
2-hydroxy-2-methyl-1-[(2-hydroxyethoxy)phenyl]propanone.

The present a-hydroxy ketone photoinitiator is for example α-hydroxycyclohexylphenyl ketone or 2-hydroxy-2-methyl-1-phenyl-1-propanone.

Straight or branched chain alkyl is for example, methyl, ethyl, propyl, isopropyl, butyl, isobutyl, sec-butyl, tert-butyl, pentyl, isopentyl, isooctyl, hexyl, heptyl, octyl, nonyl, decyl or dodecyl. Likewise alkoxy or alkylthio are of the same straight or branched chains.

The present PI blends are for example a mixture of bis(2,4,6-trimethylbenzoyl)phenylphosphine oxide (CAS# 162881-26-7) and 2,4,6,-trimethylbenzoylethoxyphenylphosphine oxide (CAS# 84434-11-7) in weight:weight ratios of about 1:11, 1:10, 1:9, 1:8 or 1:7.

Another especially suitable PI blend is a mixture of bis(2,4,6-trimethylbenzoyl)phenylphosphine oxide, 2,4,6,-trimethylbenzoylethoxyphenylphosphine oxide and 2-hydroxy-2-methyl-1-phenyl-1-propanone (CAS# 7473-98-5) in weight ratios of for instance about 3:1:15 or 3:1:16 of 4:1:15 or 4:1:16.

Another suitable PI blend is a mixture of bis(2,4,6-trimethylbenzoyl)phenyl-phosphine oxide and 2-hydroxy-2-methyl-1-phenyl-1-propanone in weight ratios of for instance about 1:3, 1:4 or 1:5.

The coatings herein refer to inner primary, outer primary and single coatings, matrix materials, inks (for application to coated optical fibers) and cabling (bundling) materials. The coatings are prepared from radiation-curable compositions that comprise for example at least one radiation-curable oligomer, possibly at least one radiation-curable monomer diluent, at least one PI blend and further additives.

The ethylenically unsaturated polymerizable compounds are radiation-curable oligomers and/or radiation-curable monomers.

The PI blend is present in the radiation-curable compositions from about 0.2 to about 10% by weight, based on the weight of the composition. For instance, the PI blend is present from about 0.5 to about 8%, about 1 to about 7%, or about 2, 3, 4, 5 or 6% by weight based on the weight of the radiation-curable composition.

The present photoinitiator components may be added to the curable compositions separately or as a blend.

For instance, this invention is directed to PI blends that are "pre-made" before adding to the curable compositions.

In general, optical fibers are coated with protective coats directly after their production. The fiber of glass is drawn and then one or more coatings are applied to the glass string. Usually, one, two or three coats are applied, the top coating, for example, is colored ("ink layer or ink coating"). Further, several thus coated optical fibers may be put together to a bundle and are coated all together, i.e. cabling of the fibers. The present compositions are suitable for any of these coatings, which have to exhibit good softness over a broad temperature range, good tensile strength and toughness and rapid UV-curing characteristics.

Optical fiber coatings are for example double layered clear urethane acrylate coatings. Both the primary and secondary coatings are applied for example to about a 1.25 mil thickness (about 25μ).

Each of the coats, inner primary (usually a soft coating), outer primary or secondary (usually a harder coating than the inner coating), tertiary or the cabling coat, may comprise at least one radiation-curable oligomer, possibly at least one radiation curable monomer diluent, the PI blend, and further additives.

Suitable optical fiber coating compositions are disclosed for example in U.S. Pat. Nos. 6,136,880, 6,187,835, 6,350,790, 6,197,422 and 6,362,249, the disclosures of which are hereby incorporated by reference.

In general all radiation curable oligomers are suitable. For example, oligomers with a molecular weight of at least 500, for example 500–10,000, 700–10,000, 1,000–8,000 or 1,000–7,000, for example urethane oligomers, containing at least one unsaturated group. For example the radiation curable oligomer has two terminal functional groups. The coat may contain not only one specific oligomer, but also mixtures of different oligomers. The preparation of suitable oligomers is known to the person skilled in the art and for example published in U.S. Pat. No. 6,136,880, incorporated herein by reference.

The radiation curable monomer can be used in a manner to control the viscosity of the coating formulation. Accordingly, a low viscosity monomer with at least one functional group capable of photoinitiated polymerization may be employed. The amount for example is chosen to adjust the viscosity in a range from 1,000 to 10,000 mPas, i.e. usually for example from 10–90, or 10–80 wt % are used. The functional group of the monomer diluent is for example the same as that of the oligomer component, for example an acrylate or vinyl ether function and a higher alkyl or polyether moiety. Examples of monomer diluents suitable for coating compositions for optical fibers are published in U.S. Pat. No. 6,136,880.

In primary coatings preferably monomers having an acrylate or vinyl ether functionality and a polyether moiety of 4 to 20 C atoms is used. Specific examples are given in U.S. Pat. No. 6,136,880.

The compositions may also comprise a poly(siloxane) as described in U.S. Pat. No. 5,595,820 to improve the adhesive properties of the formulation on the optical fiber glass substrate.

The coating compositions usually also comprise further additives, e.g. antioxidants, light stabilizers and/or UV absorbers, for instance IRGANOX® 1035, 1010, 1076, 1222, TINUVIN® P, 234, 320, 326, 327, 328, 329, 213, 292, 144, 622LD (all provided by Ciba Specialty Chemicals), ANTIGENE® P, 3C, FR, GA-80, SUMISORB® TM-061 (provided by Sumitomo Chemical Industries Co.), SEE-SORB® 102, 103, 501, 202, 712, 704 (provided by Sypro Chemical Co., Ltd.), SANOL® LS770 (provided by Sankyo Co. Ltd.), to prevent the coloring of the coat, in particular during the processing, and to improve the stability of the cured coat. Particularly interesting are stabilizer combinations of hindered piperidine derivatives (HALS) and hindered phenol compounds, e.g. a combination of IRGANOX® 1035 and TINUVIN® 292, for example in a ratio of 1:1. Further, additives are for example welling agents and other additives having an effect on the rheology properties of the coating. Also amines, for example diethylamine, can be added. Other examples for additives for compositions for the coating of optical fibers are silane coupling agents, e.g. γ-aminopropyltriethoxysilane, γ-mercaptopropyltrimethoxysilane, γ-methacryloxypropyl-trimethoxysilane, SH6062, SH6030 (provided by Toray-Dow Corning Silcone Co., Ltd.), KBE 903, KBE 603, KBE 403 (provided by Shin-Etsu Chemical Co., Ltd.). In order to prevent coloring of the coatings the compositions may also comprise fluorescent additives or optical brighteners, as, for example, UVIT® OB, provided by Ciba Specialty Chemicals. Light stabilizers such as the hydroxyphenylbenzotriazole and tris-aryl-s-triazine ultraviolet light absorbers may be employed.

Other known photoinitiators may be employed. For example, other mono- or bisacylphosphinoxides such as diphenyl-2,4,6-trimethylbenzoylphosphine oxide or bis(2,6-dimethoxybenzoyl)-2,4,4-trimethylpentylphosphineoxide; α-hydroxyketones, such as 1-hydroxycyclohexylphenylketone or 2-hydroxy-1-[4-(2-hydroxyethoxy)phenyl]-2-methyl-1-propanone; α-aminoketones, such as 2-methyl-1-[4-(methylthio)phenyl]-2-(4-morpholinyl)-1-propanone, 2-benzyl-2-(dimethylamino)-1-[4-(4-morpholinyl)phenyl]-1-butanone, 2-(4-methylbenzyl-2-(dimethylamino)-1-[4-(4-morpholinyl)phenyl]-1-butanone or 2-benzyl-2-(dimethylamino)-1-[3,4-dimethoxyphenyl]-1-butanone; benzophenones, such as benzophenone, 2,4,6-trimethylbenzophenone, 4-methylbenzophenone, 2-methylbenzophenone, 2-methoxycarbonylbenzophenone, 4,4'-bis(chloromethyl)-benzophenone, 4-chlorobenzophenone, 4-phenylbenzophenone, 4,4'-bis(dimethylamino)benzophenone, 4,4'-bis(diethylamino)benzophenone, methyl 2-benzoylbenzoate, 3,3'-dimethyl-4-methoxybenzophenone, 4-(4-methylphenylthio)benzophenone, 2,4,6-trimethyl-4'-phenyl-benzophenone or 3-methyl-4'-phenyl-benzophenone; ketal compounds, for example 2,2-dimethoxy-1,2-diphenyl-ethanone; and monomeric or dimeric phenylglyoxylic acid esters, such as methylphenylglyoxylic acid ester, 5,5=-oxo-di(ethyleneoxydicarbonylphenyl) or 1,2-(benzoylcarboxy)ethane.

The formulations, in order to enhance the properties of the photoinitiators, may also comprise sensitizer compounds, for example amines.

The coatings are either applied "wet on dry" or "wet on wet". In the first case after the application of the primary coat a curing step by irradiation with UV light is carried out prior to the application of the second coat. In the second case both coatings are applied and cured together by irradiation with UV light.

The curing with UV irradiation in this application usually takes place in a nitrogen atmosphere. In general all radiation sources usually employed in the photocuring technique can be used for the curing of optical fiber coatings. These are, for example the radiation sources listed below. Generally, mercury medium pressure lamps or/and Fusion D lamps are used. Also flash lights are suitable. It is evident that the emission of the lamps is matched with the absorption of the photoinitiator or photoinitiator mixture which is used. The optical fiber coating compositions may also be cured by irradiation with an electron beam, in particular with low power electron beams.

In order to distinguish different fibers in an assembly, the fibers may be covered with a third colored coating ("ink coating"). The compositions used for this coating in addition to the polymerizable components and the photoinitiator comprise a pigment or dye. Examples for pigments suitable for optical fiber coatings are inorganic pigments, such as for example titanium dioxide, zinc oxide, zinc sulfide, barium sulfate, aluminium silicate, calcium silicate, carbon black, black iron oxide, copper chromite black, iron oxides, chromium oxide greens, iron blue, chrome green, violet (e.g. manganese violet, cobalt phosphate, $CoLiPO_4$), lead chromates, lead molybdates, cadmium titanate and pearlescent and metallic pigments, as well as organic pigments, such as monoazo pigments, di-azo pigments, di-azo condensation pigments, quinacridone pigments, dioxazine violet, vat pigments, perylene pigments, thioindigo pigments, phthalocyanine pigments and tetrachloroisoindolinones. Examples for suitable pigments are carbon black for a black coating, titanium dioxide for a white coating, diarylide yellow or diazo based pigments for yellow coatings, phthalocyanine blue, and other phthalocyanines for blue coatings, anthraquinone red, naphthole red, monazo based pigments, quinacridone pigments, anthraquinone and perylenes for red coatings, phthalocyanine green and nitroso based pigments for green coatings, monazo and diazo based pigments, quinacridone pigments, anthraquinones and perylenes for orange coatings, and quinacridone violet, basic dye pigments and carbazole dioxazine based pigments for violet coatings. The person skilled in the art is well aware of formulating and combining suitable further pigments if even more colored coatings, such as aqua, brown, gray, pink etc. are needed.

The mean particle size of the pigments usually is about 1 μm or less. The size of commercial pigments can be reduced by milling, if necessary. The pigments for example, can be added to the formulation in the form of a dispersion in order to simplify the mixing with the other ingredients of the formulation. The pigments are, for example dispersed in a low viscosity liquid, e.g. a reactive diluent. Preferred is the use of organic pigments. Suitable amounts for pigment in the ink coating are for example 1–20, 1–15, preferably 1–10 wt %.

The ink coating in general also comprises a lubricant to provide improved break-out properties of the single coated optical fiber from the matrix. Examples of such lubricants are silicones, fluorocarbon oils or resins and the like, preferably a silicone oil or a functionalized silicone compound, e.g. silicone diacrylate is used.

The compositions according to the present invention are further suitable as a matrix material for an assembly of coated optical fibers. That is, several of the primary, secondary (and in some cases tertiary) coated fibers, for example in the third coat being differentiated by different colors, are assembled in a matrix.

The coating of an assembly besides the additives given above may also contain release agents to allow for easy access to the individual fibers during the installation of the optical fiber cables.

Examples for such release agents are teflon, silicones, silicon acrylates, fluorocarbon oils or resins and the like. The release agents suitably are added in an amount of 0.5–20 wt %. Examples of ink coatings and matrix materials for coated optical fibers are given in U.S. Pat. Nos. 6,197,422, 6,130,980 and EP 614099, incorporated herein by reference.

The present PI blends are also useful for composites and gel coats.

The present invention is also aimed at a process for forming cured optical fiber coatings. Accordingly, provided is a process which comprises curing an optical fiber coating composition with ultraviolet radiation or daylight or with light sources equivalent to daylight, wherein said optical fiber coating composition comprises
at least one ethylenically unsaturated polymerizable compound and
a photoinitiator blend, wherein the blend comprises
(a) at least one bisacylphosphine oxide photoinitiator and
(b) at least one monoacylphosphine oxide photoinitiator wherein the (a):(b) weight:weight ratio is between about 1:32 and about 1:5.5 or
(c) at least one bisacylphosphine oxide photoinitiator and
(d) at least one monoacylphosphine oxide photoinitiator and
(e) at least one α-hydroxy ketone photoinitiator wherein the (c):(d):(e) weight:weight:weight: ratio is between about 2:1:14 to about 5:2:17 or
(f) at least one bisacylphosphine oxide photoinitiator and
(g) at least one α-hydroxy ketone photoinitiator wherein the (f):(g) weight:weight ratio is between about 1:3 to about 1:5.

All parts and percentages are by weight unless otherwise noted.

The present PI blends are for example a mixture of bis(2,4,6-trimethylbenzoyl)phenylphosphine oxide and 2,4,6,-trimethylbenzoylethoxyphenylphosphine oxide (CAS# 84434-11-7) in a weight:weight ratio of about 1:9; or the PI blend is a mixture of bis(2,4,6-trimethylbenzoyl)phenylphosphine oxide, 2,4,6,-trimethylbenzoylethoxyphenylphosphine oxide and 2-hydroxy-2-methyl-1-phenyl-1-propanone in a weight ratio of about 3.5:1.0:15.5; or the PI blend is a mixture of bis(2,4,6-trimethylbenzoyl)phenylphosphine oxide and 2-hydroxy-2-methyl-1-phenyl-1-propanone in a weight ratio of about 1:4.

These PI blends are employed in the following Examples.

EXAMPLE 1

Preparation of a Primary Coating

The following mixture is prepared:
55 parts aliphatic urethane acrylate oligomer
42 parts aliphatic oxyglycidyl acrylate
3 parts PI blend
1 part bis hindered phenolic sulfide antioxidant The mixture is applied to a glass plate with an applicator bar in a thickness of 250 micron (0.25 mm) and irradiated with ultraviolet radiation using a Fusion D and a medium pressure mercury lamp. The irradiation is carried out under a nitrogen stream. A cured coating is obtained.

EXAMPLE 2

Preparation of an Ink Coating

A mixture of the following components is prepared:
56 parts of epoxy acrylate oligomer
33 parts of alkoxylated aliphatic diacrylate
1.5 parts of pigment dispersion
0.5 parts of polyether modified dimethyl polysiloxane
9.0 parts of PI blend The composition is applied to glass plates, which, prior to the application of the ink coating have been coated with a composition according to Example 1, i.e. the ink composition is placed on top of the coating according to Example 1. The thickness of the ink coating is 75 microns (0.075 mm). The coated sample is then irradiated with ultraviolet light using a combination of a Fusion D and a mercury medium pressure lamp. The cured coating provides a good adhesion to the inner coating.

EXAMPLE 3

Preparation of an Ink Coating

A mixture of the following components is prepared:
49.0 parts of polyether urethane acrylate
21.0 parts of ethoxylated bisphenol A diacrylate
21.0 parts of N-vinyl caprolactam
3.0 parts of trimethylol propane triacrylate
4.0 parts of PI blend
1.5 parts of pigment dispersion
0.5 parts of silicone oil The mixture is applied and cured according to the method described in Example 2. The cured coating provides good adhesive properties on the inner coating.

EXAMPLE 4

Preparation of Secondary Coating

The following mixture is prepared:
20 parts urethane acrylate oligomer
20 parts ethoxylated bisphenol A diacrylate
32 parts propoxylated trimethylol propane triacrylate
25 parts di-trimethylolpropane tetraacrylate
3 parts PI blend The composition is applied to glass plates, which, prior to the application of the secondary coating have been coated with a composition according to Example 1, i.e. the secondary coating composition is placed on top of the coating according to Example 1. The thickness of the secondary coating is 25 microns (0.025 mm). The coated sample is then irradiated with ultraviolet light using a combination of a Fusion D and a mercury medium pressure lamp. The cured coating provides a good adhesion to the inner coating.

EXAMPLE 5

The viscosity of a 3.5:1.0:15.5 mixture of bis(2,4,6-trimethylbenzoyl)phenyl-phosphine oxide: 2,4,6,-trimethylbenzoylethoxyphenylphosphine oxide: 2-hydroxy-2-methyl-1-phenyl-1-propanone at 25° C. is measured at 43 cps.

Conditions=Brookfield Model DV-II+at 100 RPM with Spindle #21.

The viscosity of a 1:9 mixture of bis(2,4,6-trimethylbenzoyl)phenylphosphine oxide: 2,4,6,-trimethylbenzoylethoxyphenylphosphine oxide at 25° C. is measured at 2177 cps.

Conditions=Same device but at 20 RPM with Spindle #21.

The invention claimed is:

1. An optical fiber coating composition which comprises at least one ethylenically unsaturated polymerizable compound and
a liquid photoinitiator blend, wherein the liquid blend consists essentially of
(c) at least one bisacylphosphine oxide photoinitiator and
(d) at least one monoacylphosphine oxide photoinitiator and
(e) at least one α-hydroxy ketone photoinitiator wherein the (c):(d):(e) weight:weight:weight: ratio is between about 2:1:14 to about 5:2:17 or
where the bisacylphosphine oxide photoinitiator is bis(2,4,6-trimethylbenzoyl)phenylphosphine oxide or bis(2,4,6-trimethylbenzoyl)-(2,4-bis-pentyloxyphenyl)phosphine oxide, where the monoacylphosphine oxide photeinitiator is 2,4,6-trimethylbenzoylethexyphenylphosphine oxide or 2,4,6-trimethylbenzoyldiphenylphosphine oxide and
the α-hydroxy ketone photoinitator is α-hydroxycyclohexylphenyl ketone or 2-hydroxy-2-methyl-1-phenyl-1-propanone.

2. A composition according to claim 1 where the photoinitiator blend consists essentially of (c) bis(2,4,6-trimethylbenzoyl)phenylphosphine oxide, (d) 2,4,6,-trimethylbenzoylethoxyphenylphosphine oxide and (e) 2-hydroxy-2-methyl-1-phenyl-1-propanone in a (c):(d):(e) weight:weight:weight ratio between about 3:1:14 and about 4:1:16.

3. A composition according to claim 2 in which the weight:weight:weight ratio is about 3.5:1.0:15.5.

4. A composition according to claim 1 which is a clear coating composition.

5. A composition according to claim 1 comprising further additives selected from the group consisting of hindered phenolic antioxidants.

* * * * *